United States Patent [19]

Spies

[11] Patent Number: 5,257,691
[45] Date of Patent: Nov. 2, 1993

[54] ARRANGEMENT FOR TRANSFERRING CASTABLE MATERIAL WITHOUT PIPES FROM A FEEDING MEANS TO A DESTINATION

[75] Inventor: Klaus Spies, Aachen-Schmithof, Fed. Rep. of Germany

[73] Assignee: Fertigbausystem Hölter & Co. GmbH, Gladbeck, Fed. Rep. of Germany

[21] Appl. No.: 692,639

[22] Filed: Apr. 29, 1991

[30] Foreign Application Priority Data

Apr. 29, 1990 [DE] Fed. Rep. of Germany ....... 4013814
Apr. 9, 1991 [DE] Fed. Rep. of Germany ....... 4111357

[51] Int. Cl.⁵ .............................................. B65G 31/04
[52] U.S. Cl. .................................... 198/642; 198/638
[58] Field of Search ................ 198/638, 639, 640, 642

[56] References Cited

U.S. PATENT DOCUMENTS

| | | | |
|---|---|---|---|
| 2,297,382 | 9/1942 | Augustin | 198/642 X |
| 2,868,351 | 1/1959 | Hegmann | 198/642 X |
| 3,512,680 | 5/1970 | Krolopp | 198/642 X |
| 3,592,393 | 7/1971 | Sinden | 198/642 X |
| 3,592,394 | 7/1971 | Sinden | 198/642 X |
| 3,710,925 | 1/1973 | Dorman | 198/642 X |
| 4,043,445 | 8/1977 | Wirth et al. | 198/642 X |
| 4,597,491 | 7/1986 | Conklin | 198/642 |

FOREIGN PATENT DOCUMENTS 0468018 7/1975 U.S.S.R. .................... 198/642

Primary Examiner—Robert P. Olszewski
Assistant Examiner—James R. Bidwell
Attorney, Agent, or Firm—Akoo - Toren

[57] ABSTRACT

An arrangement for transferring castable material without pipes or conduits from a feeding point to a destination, particularly in underground mining. The arrangement includes a driven centrifugal wheel with blades. The centrifugal wheel is radially open and is surrounded in the manner of a jacket by an endless housing belt which is guided on guide rollers. The portion of the centrifugal wheel which is radially open is bordered by the guide roller which causes the housing belt to contact the centrifugal wheel and by the guide roller which raises the housing belt from the centrifugal wheel. The material is radially discharged in a concentrated manner through this radially open portion. The material is supplied axially to the centrifugal wheel through a feed tube and enters through a discharge opening of the feed tube on the vertical level of the blades into the centrifugal wheel.

3 Claims, 6 Drawing Sheets

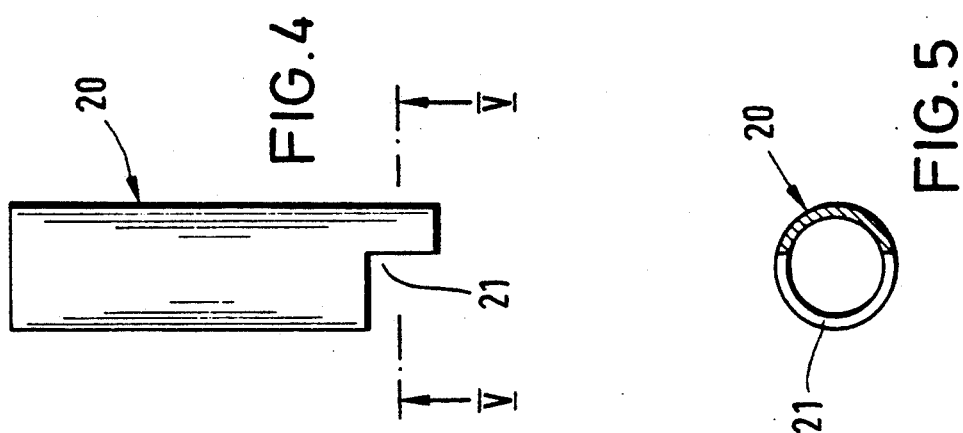
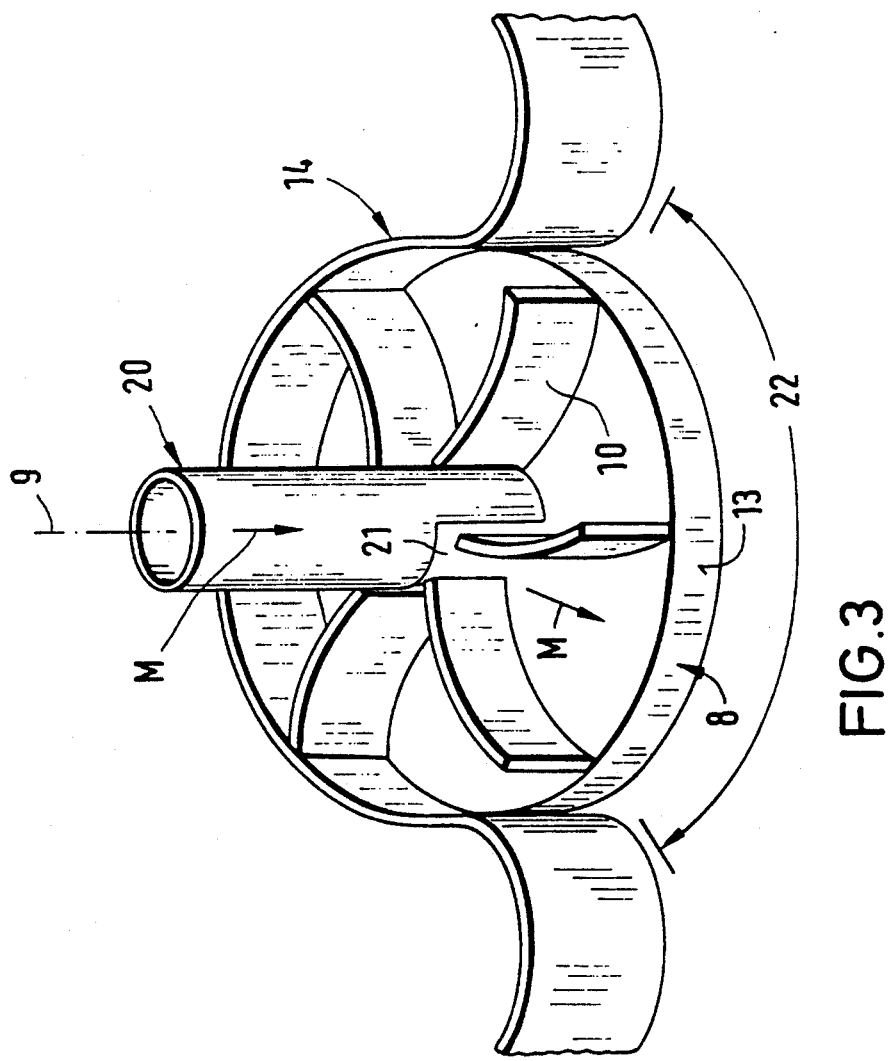

1

ARRANGEMENT FOR TRANSFERRING CASTABLE MATERIAL WITHOUT PIPES FROM A FEEDING MEANS TO A DESTINATION

BACKGROUND OF THE INVENTION

1. Field of the Invention

The present invention relates to an arrangement for transferring castable material without pipes or conduits from a feeding means to a destination, particularly in underground mining. The arrangement includes a radially open centrifugal wheel which rotates about an axis and has essentially radially extending blades. The arrangement further includes a housing belt. The material is axially supplied to the centrifugal wheel and is radially discharged therefrom.

2. Description of the Related Art

In a known arrangement of the above-described type, the feeding means is a hopper arranged above the central portion of the centrifugal wheel. The material to be transferred is conducted from the hopper into the centrifugal wheel through an eccentrically arranged segment-like opening in the bottom of the hopper. The centrifugal wheel has an upper annular disk whose central recess corresponds to the diameter of the lower end of the hopper. The closed bottom of the centrifugal wheel is arranged spaced apart from the annular disk. The closed bottom has, in the center thereof, an essentially conical deflection hub which extends over about ¾ of the height of the centrifugal wheel. The surface of the deflection hub is concavely curved. The annular disk and the bottom of the centrifugal wheel are spaced apart from each other by straight blades which extend from the circumference of the centrifugal wheel over about ¼ of the diameter of the centrifugal wheel. The blades are arranged inclined at an angle relative to a plane which extends from the circumference of the centrifugal wheel through the axis of rotation of the centrifugal wheel.

A housing belt is provided at the circumference of the centrifugal wheel. The housing belt is guided around altogether six guide rollers, two of which guide rollers form the lateral borders of a discharge portion of the centrifugal wheel. One of these rollers at the border is constructed as a drive for the housing belt and this roller simultaneously serves as the drive for the centrifugal wheel.

The centrifugal wheel and the housing belt are mounted in a housing whose curved side wall partially also surrounds the guide rollers which form the borders of the discharge portion.

The material, which is eccentrically fed through the hopper under gravity into the centrifugal wheel, is deflected at the deflection hub into the plane of the centrifugal wheel and is displaced by the blades as a result of the influence of centrifugal force toward the housing belt. The material is taken along by the housing belt and is subsequently radially discharged through the discharge portion.

The known arrangement has the disadvantage that the material is introduced eccentrically into the centrifugal wheel and, thus, the material cannot be aligned in a defined manner at the inlet side. Rather, the material initially slides through, relative to the bottom of the centrifugal wheel and is then contacted by the blades at a location which cannot be predetermined and is moved in an uncontrolled manner, and without directions in the entire region of the centrifugal wheel, so that damage to the arrangement cannot be avoided.

However, the region which is subjected to the most severe impact-like loads is the region in which the housing belt is pressed again at the centrifugal wheel. Moreover, very high shear loads are unavoidable when the circumferential edge of a blade comes again into contact with the housing belt and material components are clamped at that moment between the blade edge, the guide roller and the housing belt. As a consequence, the service life of the flexible housing belt is very limited. In addition, the drive of the housing belt can also not prevent relative movements of housing belt and centrifugal wheel in the case of slight jams. These relative movements also lead to an increased wear.

SUMMARY OF THE INVENTION

Therefore, it is the object of the present invention to improve an arrangement of the above-described type. In particular, particulate and granular as well as liquid-pasty material is to be transferred from a feeding means to a destination with substantially lower wear of the housing belt, and the centrifugal wheel while maintaining an optimum operation of the arrangement.

In accordance with the present invention, the centrifugal wheel is over a predominant portion of its circumference surrounded in the manner of a jacket by an endless housing belt which travels with the same speed as the centrifugal wheel. Means for the oriented introduction of the material into the blade plane are provided at the inlet side of the centrifugal wheel and/or means at the discharge side for the ray-shaped bundling, or concentration of the material are provided in the region of the circumferential portion of the centrifugal wheel which is not surrounded by the housing belt.

Thus, the present invention ensures that at the inlet side of the centrifugal wheel the material is supplied axially at the location of the lowest force influence in the center of the centrifugal wheel. Wear can be kept to a minimum in the region of the center of the centrifugal wheel because no circumferential speed or only a small circumferential speed prevails at this location and, thus, the shearing forces are low. In addition, the alignment of the material at the inlet side provides the advantage that the material is not admitted in a predetermined manner to that region of the centrifugal wheel in which the housing belt again makes contact with the circumference of the centrifugal wheel, and forms a circumferential border of the centrifugal wheel. The alignment of the material at the inlet side also ensures that the material is moved in the blade plane on predetermined paths. For example, the material can be kept away in a predetermined manner from the areas at the outer circumference of the centrifugal wheel which are subject to extremely high wear. Consequently, the material cannot be wedged into the corner at which the housing belt again makes contact with the centrifugal wheel and increased wear of the housing belt, on the one hand, and of the centrifugal wheel, on the other hand, are prevented. This is particularly important because, in dependence on the diameter and the rate of rotation of the centrifugal wheel, the forces and velocities prevailing at the outer circumference are many times higher than at the inner diameter.

Accordingly, the invention makes it possible to transfer the material on an oriented path from the axial inlet area toward the discharge area of the centrifugal wheel which is not surrounded by the housing belt. The material can be discharged in a predetermined concentration from this discharge area. The material is moved gently and in a defined manner with continuously increasing acceleration from the location of the material input toward the outside. On the circumference of the centrifugal wheel, the material then has the same circumferential speed as the housing belt, so that in an ideal manner no relative movement occurs between the material and the housing belt and, thus, wear is eliminated. The housing belt which surrounds most of the circumference of the centrifugal wheel in the manner of a jacket only has a guiding function and not an accelerating function.

Contrary to the arrangements known in the art, any uncontrolled movements of the material to be transferred is eliminated on the entire path of the material from the axial input to the concentrated radial discharge. It is also significant that the distance between the guide rollers which form the borders of the circumferential portion of the centrifugal wheel which is not surrounded by the housing belt can be adapted to the material being transferred in such a way that always a concentrated discharge can take place over the desired section of the circumference. Accordingly, the service life of the arrangement, particularly in the area where the housing belt again makes contact with the centrifugal wheel, is substantially increased.

An advantageous feature of the arrangement according to the present invention for transferring granular and particulate material provides that the means for the oriented introduction of the material is formed by a non-rotating feed tube which extends axially into the centrifugal wheel and has a radially directed outlet opening located vertically on the level of the blades. The outlet opening on the vertical level of the blades ensures that the material is transferred in an oriented manner in the blade plane, so that the material is not conducted to the extremely endangered portion of the arrangement, i.e. the portion where the housing belt again makes contact with the circumference of the centrifugal wheel, and this portion is therefore not subjected to impact loads from the material. The size of the outlet opening and its relative position to the guide roller which causes the housing belt to be again in contact with the centrifugal wheel, depend on the type and quality of the material to be transferred, the material-specific coefficient of friction of the centrifugal wheel and the structural dimension of the arrangement particularly the distance of the outlet opening from the circumference of the centrifugal wheel.

In accordance with another feature, a non-rotating feed tube which extends axially into the centrifugal wheel is radially widened at the entry into the centrifugal wheel, and a central deflection hub of the centrifugal wheel extends into the widened portion of the feed tube. This feature is particularly advantageous if liquid-pasty material is to be transferred by casting from a feeding means to a destination. The deflection hub may have an essentially conical cross-section with concave upper surface. Since the deflection hub projects into the feed tube, the material is received by the centrifugal wheel while it is still in the feed tube and the material is then conducted further. The upper edges of the blades in the entry area of the material into the centrifugal wheel may have a shape which facilitates a deflection of the volumetric flow of the material from the axial into the radial direction and at the beginning of the acceleration phase which is low in wear. Moreover, it is advantageous that on the entry side of the material there are arranged mixing units, conveying units which reinforce the conveyance or comminuting units through which the material flows before it enters the centrifugal wheel. The rate of rotation of the units for conveying, mixing and comminuting may correspond to the rate of rotation of the centrifugal wheel.

In accordance with another feature of the present invention, the circumferential portion of the centrifugal wheel which is not covered by the housing belt and serves to discharge the material is partially covered by a material deflector. As a result, the area where the housing belt again makes contact with the centrifugal wheel is additionally protected. The inner side of the material deflector is adapted to the contour of the centrifugal wheel and prevents material components from being wedged into the corner between the centrifugal wheel and the guide roller which causes the housing belt again to make contact with the centrifugal wheel and, thus, the material components cannot damage the housing belt or the centrifugal wheel. On the side facing away from the centrifugal wheel, the material deflector is wedge-shaped starting at the circumference of the centrifugal wheel in order to contribute with its outer surface to the concentration of the material.

In accordance with another advantageous feature of the present invention, the means at the discharge side for the concentration of the material is formed by a pipe piece which is connected approximately tangentially to the circumferential portion of the centrifugal wheel which is not surrounded by the housing belt and is defined by the two guide rollers of the housing belt. The concentration of the discharge material takes place in accordance with its discharge speed and its properties. The shape of the side surfaces of the pipe piece located in the plane of the centrifugal wheel and the relative arrangement of these side surfaces relative to each other are selected in such a way that no contact, or virtually no contact, takes place with the material. This is particularly important in the case of granular material or substances which contain granular components, so that the granules do not contact or infrequently contact the side surfaces when they are discharged since reflections would mean that the ray-shaped concentrated material is spread apart. In the region of the circumference of the centrifugal wheel, the pipe piece has such a construction that the material components which are not discharged through the pipe piece are returned in a perfectly oriented manner into the centrifugal wheel and cannot reach the endangered corner between the centrifugal wheel and the housing belt where it again makes contact with the centrifugal wheel.

The ray-shaped concentration of the material is further improved if the pipe piece is constructed so as to conically narrow toward the discharge opening thereof.

Another feature of the present invention provides that the means for the ray-shaped concentration of the material at the discharge side is formed by a length portion of the housing belt extending tangentially to the circumference of the centrifugal wheel and by an endless concentrating belt which is mounted on guide rollers and is located exactly opposite the length portion of the housing belt. Accordingly, two surfaces which move together with the material to be discharged are arranged opposite each other, so that friction between the material and the housing belts and the concentrating belts are essentially avoided. In addition, even if granular material is being transferred, impact processes which would spread the material apart do not occur. It is certainly conceivable that the length portion of the housing belt, extending tangentially to the circumference of the centrifugal wheel, can be used either alone or together with the concentrating belt.

The concentrating effect is further improved if the oppositely located length portion of the housing belt and the concentrating belt extend at an angle relative to each other.

In accordance with another development of the invention, the guide rollers at the discharge side of the oppositely located length portion of the housing belt and the concentrating belt are displaceable transversely of the discharge direction. As a result, the concentration effect of the material being transferred can be adjusted in an optimum manner. Thus, the relative positions of the housing belt and of the concentrating belt can be adjusted in an optimum manner for any case of application.

The centrifugal wheel and the housing belt, which rests against and is driven by the centrifugal wheel, are driven through a belt drive by a motor located next to the centrifugal wheel and next to the housing belt. Accordingly, the housing belt is not driven directly but is driven through the centrifugal wheel. Appropriate tensioning means ensure the necessary slip-free contact of the housing belt with the centrifugal wheel.

However, under certain operational circumstances, it may be advantageous if at least one of the guide rollers for the housing belt is also driven by a motor. By driving the housing belt in this manner, slippage is avoided between the housing belt and the centrifugal wheel.

The drive for the centrifugal wheel and/or the housing belt may be electrical, pneumatic or hydraulic.

In order to increase the service life of the housing belt, another advantageous feature of the present invention provides that the housing belt has, on the side facing the centrifugal wheel, a wear protection layer.

The wear of the centrifugal wheel which must be expected after longer periods of operation leads to irregular material discharge and thus, in the case of high rates of rotation of the centrifugal wheel, to mass forces which become apparent as imbalances. Therefore, sensors can be arranged on at least one bearing point of the centrifugal wheel in order to determine any forces which may result from the mass imbalance of the quickly rotating centrifugal wheel. The measured values of the imbalance sensors can be converted into adjustment impulses for eliminating the imbalance by means of at least one mass compensating device arranged at the centrifugal wheel.

The arrangement according to the present invention for transferring castable material without pipes from a feeding means to a destination can be used in many areas. For example, one of the areas is underground mining, and particularly the filling of hollow spaces which necessarily are created in the production of valuable minerals. Examples for this are filling of the hollow spaces created in the longwall in longwall working, and of the parallel roads and the filling of chambers in pillar-and-stall working. However, the invention can also be utilized for manufacturing parallel high roads, for the application of adhesive material on surfaces or for transferring dumped material to another location. The arrangement of the invention can also be utilized in depositing technology, in loading and unloading railroad freight cars and ships. The arrangement can also be utilized for applying sprayed concrete. Furthermore, it is possible to use the arrangement as an additional accelerator for hydraulically conveyed or pumped solids. Furthermore, it is conceivable to utilize such an arrangement in area fires. It has been found advantageous to use solid particulate or granulated fire extinguishing agents which are cast into the area fire and when heated develop gases which extinguish the flames. Finally, it is conceivable to use the arrangement for loading and unloading bulk material and to an increasing extent in agriculture.

While specific embodiments of the invention have been shown and described in detail to illustrate the inventive principles, it will be understood that the invention may be embodied otherwise without departing from such principles.

BRIEF DESCRIPTION OF THE DRAWING

In the drawing:

FIG. 3 is a perspective view of a centrifugal wheel of the arrangement of FIG. 1;

FIG. 4 is a side view of a feed tube for the centrifugal wheel of FIG. 3;

FIG. 5 is a horizontal cross-sectional view of the feed tube of FIG. 4 taken along sectional line V—V;

DESCRIPTION OF THE PREFERRED EMBODIMENT

Figure 1:
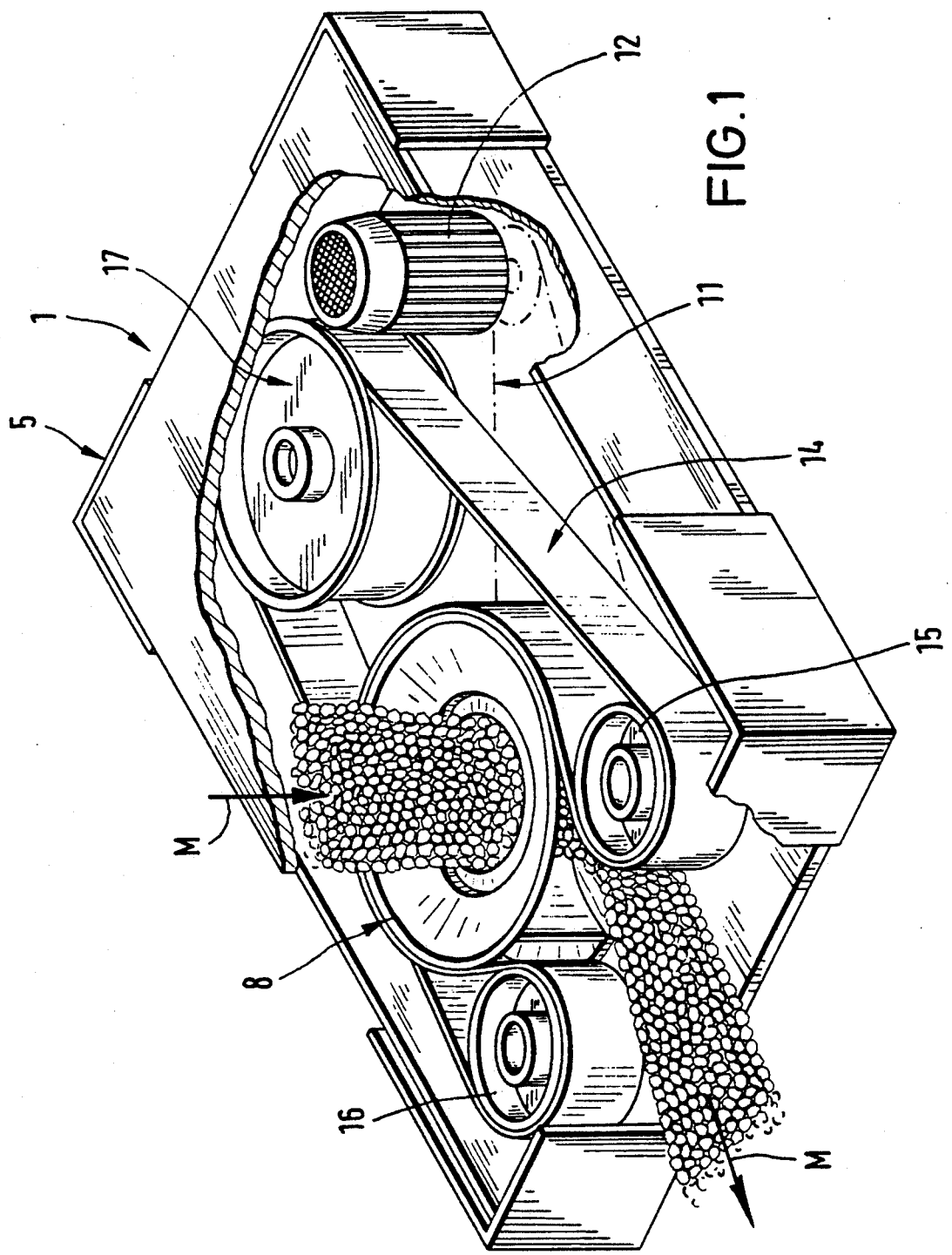
FIG. 1 is a perspective view, partially in section, of an arrangement for transferring castable material from a feeding means to a destination according to the present invention.
Figure 2:
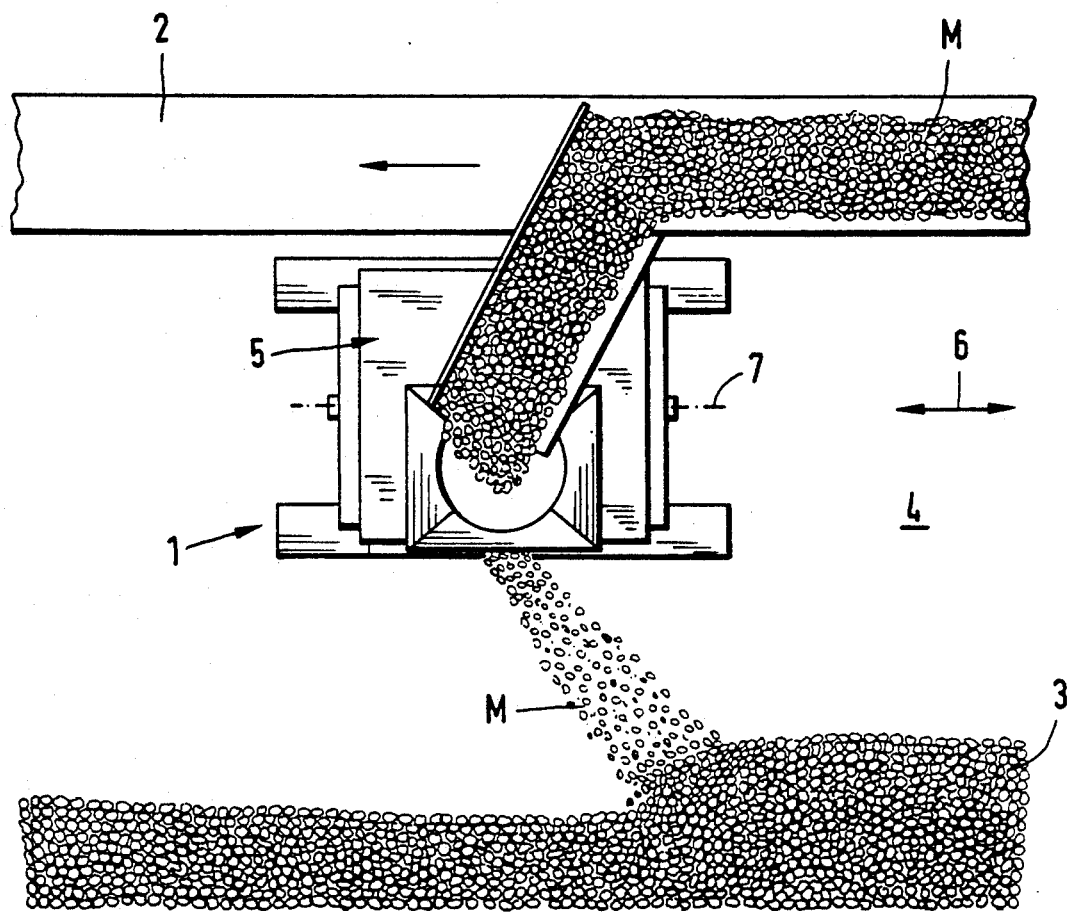
FIG. 2 is a plan view of the arrangement of FIG. 1 used in a longwall in underground mining.

In FIGS. 1 and 2 of the drawing, reference numeral 1 denotes an arrangement for transferring castable granular material from a feeding means to a destination. As illustrated in FIG. 2, the feeding means may be, for example, a conveyor belt 2 and the destination may be the stowing area 3 of a longwall 4.

Figure 7:
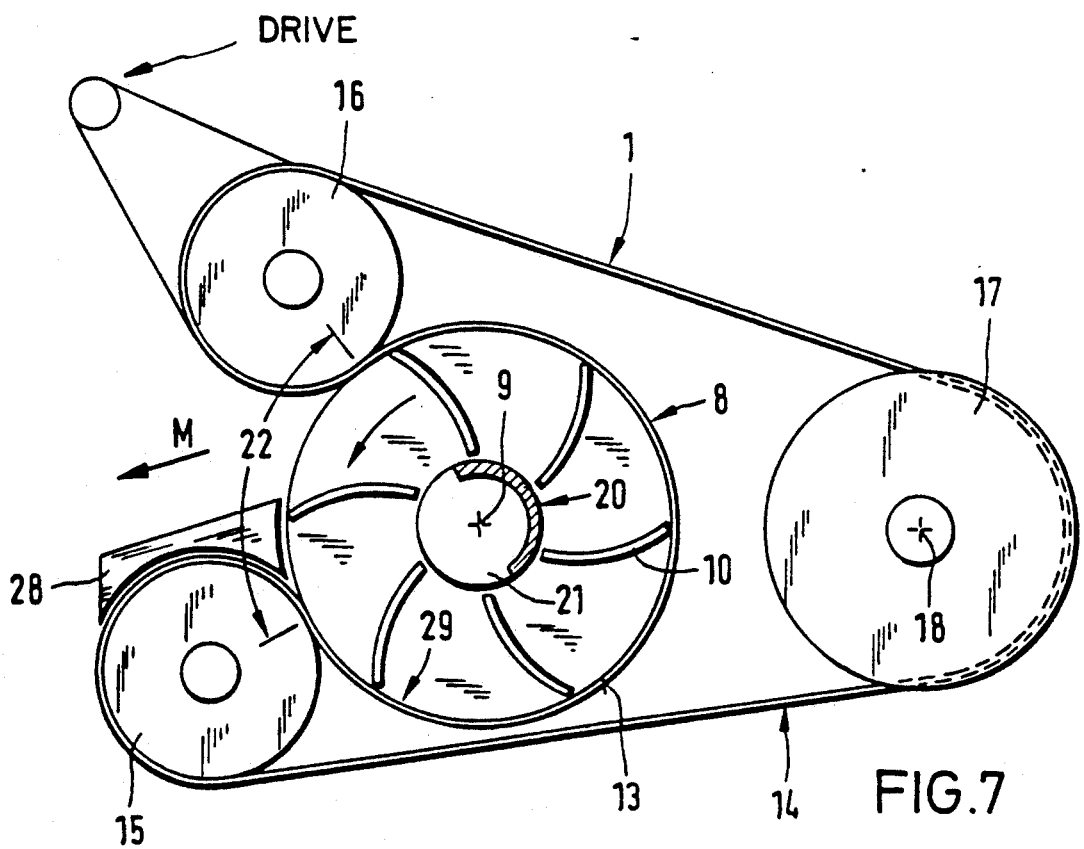
FIG. 7 is a schematic plan view of a third embodiment of the arrangement of FIG. 1.

The arrangement 1 includes a housing 5 which, as shown in FIG. 2 by a double arrow 6, is displaceable in longitudinal direction of the longwall 4 and which additionally can be tilted about an axis 7. As also illustrated in FIG. 7, a centrifugal wheel 8 which is rotatable about an axis 9 is arranged in the housing 5. The centrifugal wheel 8 is radially open and has blades 10 which are concavely curved in the direction of rotation. As FIG. 1 additionally shows, the centrifugal wheel 8 is driven through a belt drive 11 by means of an electric motor 12 which is also arranged in the housing 5.

As can best be seen in FIGS. 1 and 7, the predominant portion of the circumference 13 of the centrifugal wheel 8 is surrounded in a jacket-like manner by an endless housing belt 14. The housing belt 14 additionally extends around altogether three guide rollers 15, 16 and 17, wherein the guide roller 15 causes the housing belt 14 to make contact with the circumference 13 of the centrifugal wheel 8 and the guide roller 16 raises the housing belt 14 from the centrifugal wheel 8. The third guide roller 17 may be mounted so as to be displaceable with its axis 18, so that the housing belt 14 can be tensioned.

Figure 6:
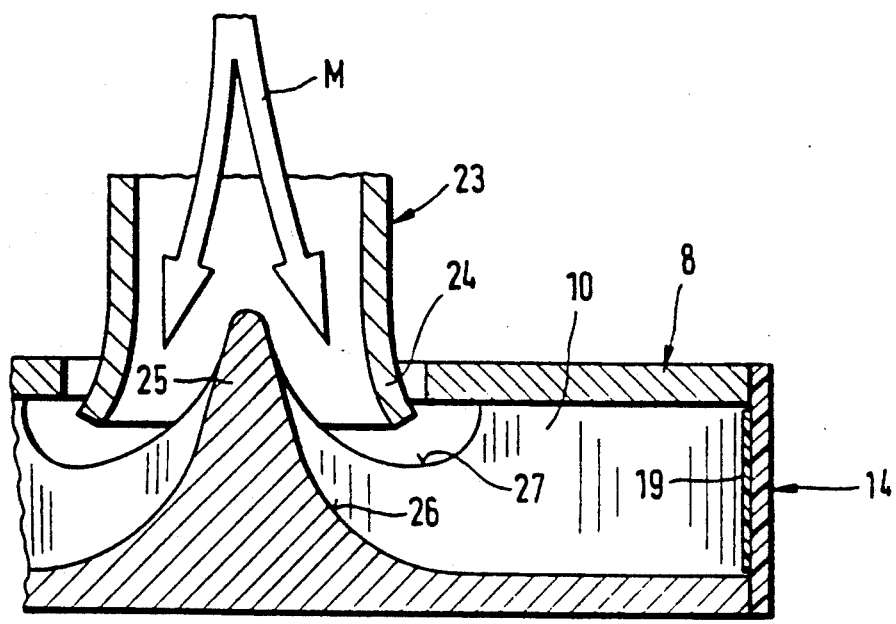
FIG. 6 is a vertical cross-sectional view of another embodiment of the arrangement of FIG. 1.

As shown in FIG. 6, it is also possible to provide the housing belt 14 on the side facing the centrifugal wheel 8 with a wear protection layer 19.

The embodiment of the invention illustrated in FIGS. 1 and 3-5 is preferably used for transferring particulate or granulate material M. The embodiment includes a cylindrical feed tube 20 which extends into the centrifugal wheel 8. The feed tube 20 is mounted in the housing 5 and is movable relative to the centrifugal wheel 8. On the vertical level of the blades 10, the feed tube 20 is provided with a radially directed outlet opening 21 through which the material M is transferred from the feed tube 20 into the centrifugal wheel 8. The size of the outlet opening 21 and its relative position to the circumferential portion 22 of the centrifugal wheel 8, which is not surrounded by the housing belt 14, as also seen in FIG. 7, depend on the material M to be transferred, the distance of the feed tube 20 from the circumference 13 of the centrifugal wheel, and on the material-specific coefficient of friction of the centrifugal wheel 8.

The embodiment of FIG. 6 includes a non-rotating feed tube 23 which extends axially into the centrifugal wheel 8 and which is radially widened at the entry into the centrifugal wheel 8. A central deflection hub 25 of the centrifugal wheel 8 extends into the widened feed tube portion 24. The essentially conically constructed deflection hub 25 has a concave upper surface 26.

In addition, the upper edges 27 of the blades 10 have in the entry area of the material M into the centrifugal wheel 8 such a shape that the wear is kept as low as possible. This embodiment is particularly suitable for liquid-pasty material M.

FIG. 7 of the drawing shows that the circumferential portion 22 of the centrifugal wheel 8 which is not covered by the housing belt, 14 and serves to discharge the material M, is partially covered by a material deflector 28. This material deflector 28 prevents components of the material M from being wedged in the corner 29 between the centrifugal wheel 8 and the guide roller 15, which causes the housing belt 14 again to make contact with the centrifugal wheel 8.

Figure 8:
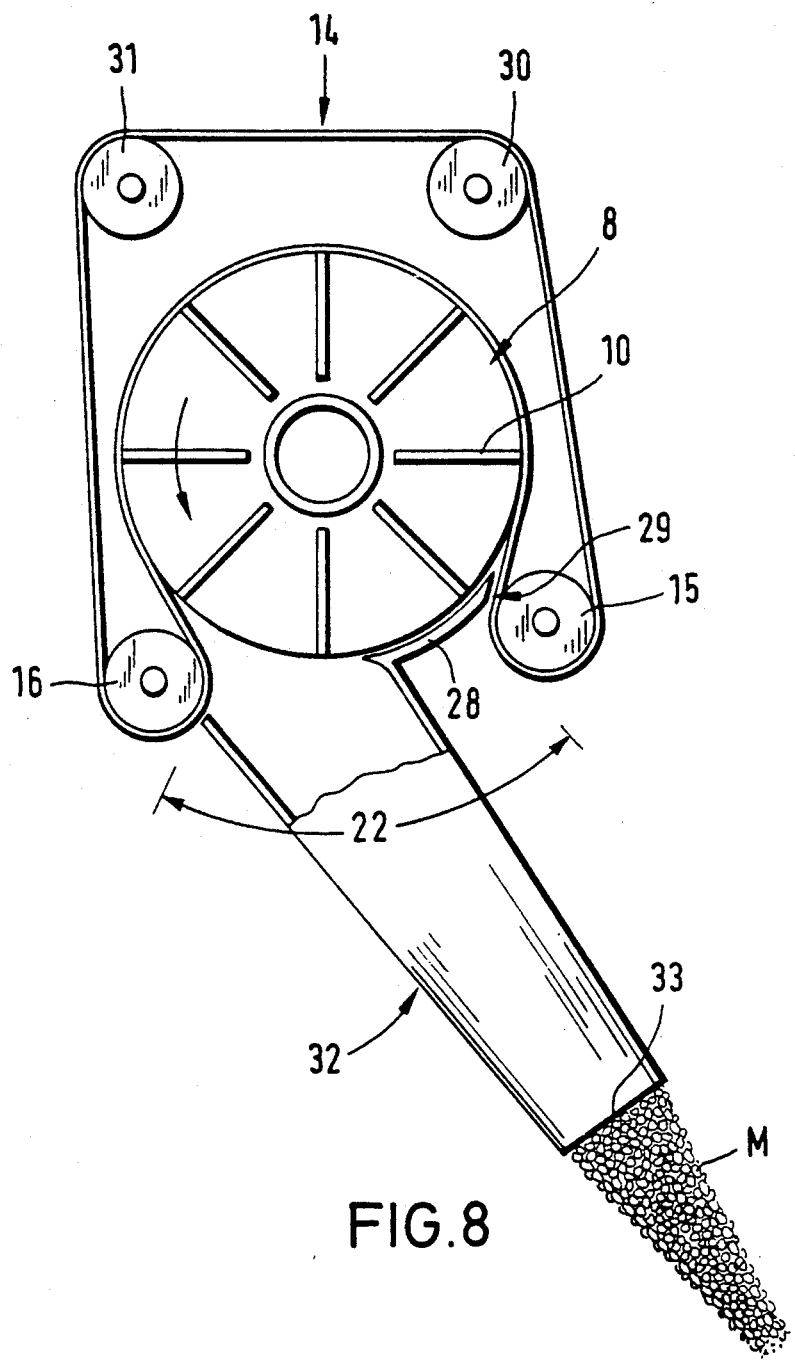
FIG. 8 is a schematic plan view of a fourth embodiment of the arrangement of FIG. 1.

In the embodiment of FIG. 8 which may include, for example, four guide rollers 15, 16, 30, 31 for the housing belt 15 (the housing itself is not illustrated), a pipe piece 32 acting as a concentrating means for the material on the discharge side is approximately tangentially connected to the circumferential portion 22 which is not surrounded by the housing belts and is defined laterally by the guide rollers 15, 16. The pipe piece 32 narrows conically toward the discharge opening 33. The corner 29 is again covered by a material deflector 28.

Figure 9:
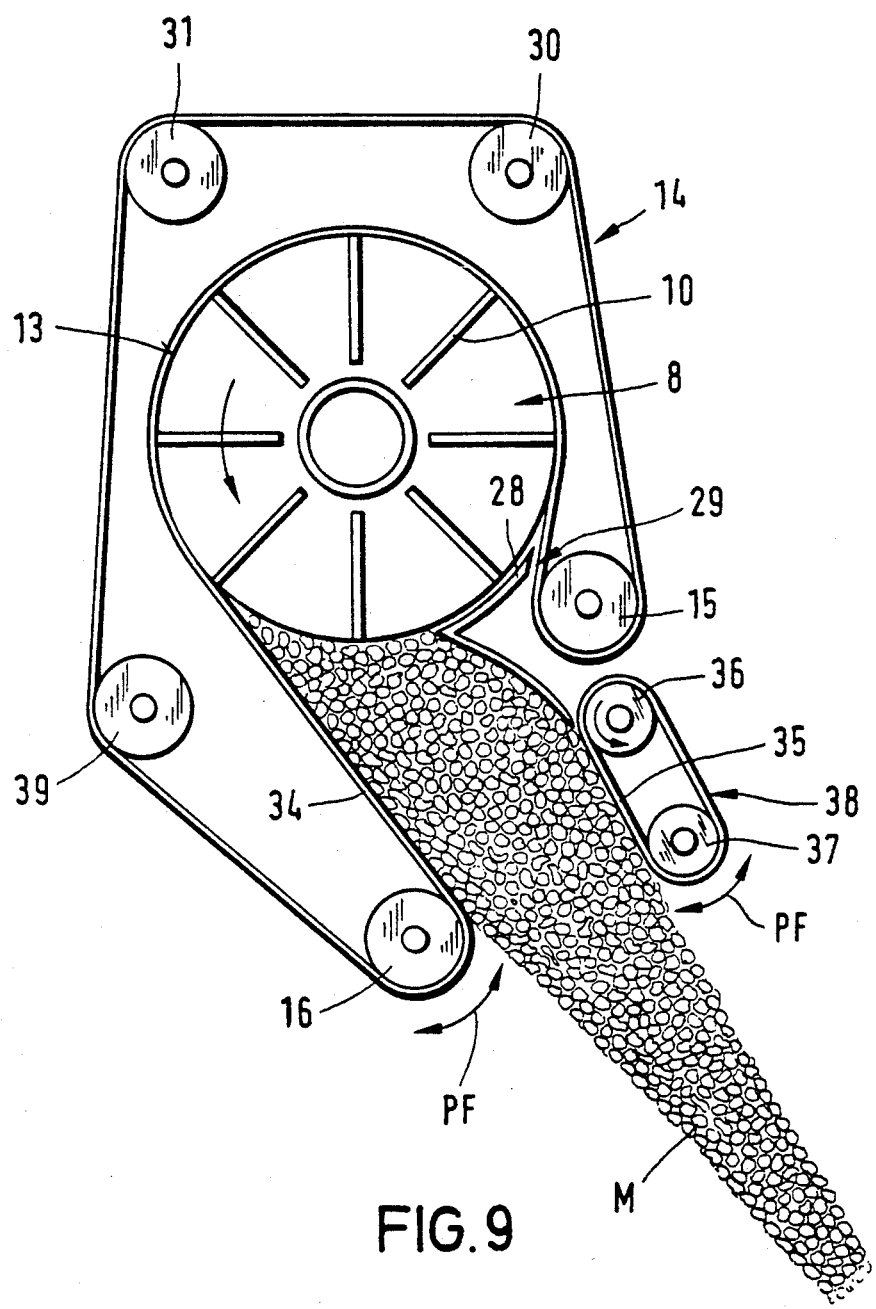
FIG. 9 is a schematic plan view of a fifth embodiment of the arrangement of FIG. 1.

In the embodiment of the invention shown in FIG. 9, the means for concentrating the material on the discharge side are formed by a length portion 34 of the housing belt 14, which extends tangentially to the circumference 13 of the centrifugal wheel 8 and by an endless concentrating belt 38 mounted on guide rollers 36, 37, and located exactly opposite the length portion 34. The housing belt 14 is guided around altogether five guide rollers 15, 16, 30, 31, 39. The guide rollers 36, 37 for the concentrating belt 38 are driven either individually or together in such a way that the two length portions 34, 35 move together with the material M. In this embodiment the corner 29 is again covered by a material deflector 28.

As FIG. 9 further shows, the oppositely located length portions 34, 35 of the housing belt 14 and of the concentrating belt 38 extend at an angle relative to each other. The guide rollers 16, 37 of the housing belt 14 and of the concentrating belt 38 at the discharge side of the oppositely located length portions 34, 35 can be transversely displaceable as indicated by arrows PF.

In the embodiments of the invention illustrated in FIGS. 8 and 9, the blades 10 of the centrifugal wheel 8 are straight and radially directed. The centrifugal wheel 8 and the housing belt 14 is driven in the same manner as described with respect to the embodiment of FIG. 1. The same is true for the embodiment shown in FIG. 7.

While specific embodiments of the invention have been shown and described in detail to illustrate the inventive principles, it will be understood that the invention may be embodied otherwise without departing from such principles.

I claim:

1. An arrangement for transferring castable material without pipes or conduits from a feeding means to a destination, comprising:

a radially open centrifugal wheel having radially extending blades rotatable about an axis;

a housing belt partially surrounding the centrifugal wheel, wherein the material is supplied axially to the centrifugal wheel and is radially discharged from the centrifugal wheel, and wherein the centrifugal wheel is surrounded over a predominant portion of its circumference in the manner of a jacket by the housing belt such that the housing belt travels at the same speed as the centrifugal wheel;

means for an oriented introduction of the material into the blade plane provided at an inlet side of the centrifugal wheel, wherein said means for oriented introduction further comprises a non-rotating feed tube extending radially into the centrifugal wheel and has a directed outlet opening located vertically on the level of the blades; and means for providing a ray-shaped concentration of the material provided on a discharge side in the region of the circumferential portion of the centrifugal wheel which is not surrounded by the housing belt;

a material deflector covering the circumferential portion of the centrifugal wheel which is not surrounded by the housing belt;

a length portion of the housing belt, wherein the means for the concentration of the material at the discharge side comprises said length portion of the housing belt extending tangentially to the circumference of the centrifugal wheel; and an endless concentrating belt mounted on guide rollers, wherein the length portion of the housing belt and the concentrating belt are located opposite each other.

2. The arrangement of claim 1, wherein the length portion of the housing belt and the concentrating belt which are located opposite each other extended at an angle relative to each other.

3. The arrangement of claim 2, wherein the guide rollers at a discharge side of the oppositely located length portion of the housing belt and of the concentrating belt are transversely displaceable.

* * * * *